Patented July 24, 1934

1,967,430

UNITED STATES PATENT OFFICE 1,967,430

METHOD OF PRODUCING TERPENES

Johannes Rebner, Finow, near Eberswalde, Germany, assignor to Schering-Kahlbaum A. G., Berlin, Germany No Drawing. Application December 10, 1932, Serial No. 646,721. In Germany December 18, 1931

9 Claims. (Cl. 260—167)

My invention refers to the production of terpenes and more especially to means whereby such compounds can be produced from pinene

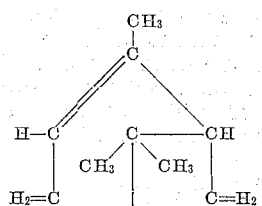

or nopinene

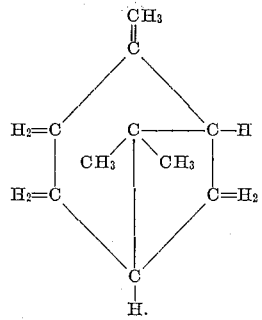

As has been shown in a copending application for patent of the United States Serial No. 527,846, filed April 4, 1931 by Fritz Ulffers and Rudolf Erbe, nopinene can be converted by catalytic action into pinene and camphene, or pinene into camphene, by acting on a material containing pinene or nopinene with catalytic quantities of an inorganic simple or complex acid or acid salt, which combine with the pinene or nopinene, if at all, only very slowly, forming in this latter case little stable addition products.

I have now made the surprising discovery, that this conversion of pinene and nopinene can also be brought about by the action of water-soluble neutral salts, especially the normal metal salts of sulfuric acid, which at temperatures up to 220° C. retain 1 molecule of water of crystallization.

These salts are distinguished from all other compounds hitherto used for this purpose by their solubility in water, whereby the further treatment of the reaction mixture can be effected more readily and at less cost, the catalysts being moreover recoverable. These salts can readily be obtained by crystallization and drying under ordinary or reduced pressure, their activity being a uniform one.

In carrying out my invention I may introduce these catalysts into the liquid heated to the usual reaction temperatures ranging between 120 and 170° C. in one or several portions and I may previously precipitate these catalysts on inactive carriers. Alternatively, the oily starting material may be passed through a layer formed by such catalysts at a temperature somewhat below the boiling point of the starting material or its vapors may be passed in contact with the catalyst, either by themselves or mixed with an inert gas, at a temperature above the boiling point of the starting material, viz. at 160–200° C.

Instead of pinene and nopinene also oils containing same may be used.

In practising my invention I may for instance proceed as follows:—

Example 1

1 kilogram pinene is boiled under the reflux condenser and 50 grams magnesium sulfate dried at 125 to 150° C. are added. After the pinene has disappeared, 200 ccms water are added, and the crude camphene, which has separated out, is treated further in a manner well known to those skilled in the art.

The dried magnesium sulfate ($MgSO_4.H_2O$) may be replaced by the corresponding sulfates of zinc, iron, cobalt, nickel or other heavy metals.

Example 2

1 kilogram nopinene is heated to 140° C. and nickel sulfate dried at 125° C. is added under stirring in portions weighing 20 to 30 grams. The reaction has come to an end as soon as nopinene and pinene have disappeared. The charge is treated further as described with reference to Example 1.

Example 3

To 1 kilogram distilled oil of turpentine are added under the reflux condenser 10 grams $MgSO_4.H_2O$ obtained from magnesium sulfate by drying in vacuo at 110° C. After a short period of time the reaction has come to an end and high-grade crude camphene is obtained.

Example 4

50 to 60 drops pinene are passed per minute together with a slow current of nitrogen gas through a tube 2 cms in diameter, which is filled for a length of 30 cms with $MgSO_4.H_2O$ precipitated on an inactive carrier substance and heated to 170° C. After a short time nopinene can be traced in the liquid leaving the tube. The crude camphene formed is treated further as usual.

Example 5

Terpene oil is allowed to flow slowly through a layer of granulated $NiSO_4.H_2O$ heated to 120 to 130° C. The pinene soon disappears, camphene being formed, which is treated further in a well known manner.

Various changes may be made in the details disclosed in the foregoing specification without departing from the invention or sacrificing the advantages thereof.

I claim:

1. The method of producing terpenes comprising reacting, at a temperature ranging between 120 and 170° C. a material, containing a body of the group formed by pinene and nopinene, with a water-soluble neutral metal salt of sulfuric acid, which at temperatures up to 220° C. retains 1 molecule of water of crystallization.

2. The method of producing terpenes comprising reacting, at a temperature ranging between 120 and 170° C. a material, containing a body of the group formed by pinene and nopinene, with a water-soluble neutral metal salt of sulfuric acid, which at temperatures up to 220° C. retains 1 molecule of water of crystallization, this salt being precipitated on an inactive carrier.

3. The method of producing terpenes comprising introducing into a liquid body of the group formed by pinene and nopinene heated to a temperature ranging between 120 and 170° C. small portions of a water-soluble neutral metal salt of sulfuric acid, which at temperatures up to 220° C. retains 1 molecule of water of crystallization.

4. The method of producing terpenes comprising passing a body of the group formed by pinene and nopinene at a temperature above 120° C., but below its boiling point through a layer of a water-soluble neutral metal salt of sulfuric acid, which at temperatures up to 220° C. retains 1 molecule of water of crystallization.

5. The method of producing terpenes comprising passing vapors of a body of the group formed by pinene and nopinene at a temperature above its boiling point in contact with a water soluble neutral metal salt of sulfuric acid, which at temperatures up to 220° C. retains 1 molecule of water of crystallization.

6. The method of producing terpenes comprising passing vapors of a body of the group formed by pinene and nopinene at a temperature above its boiling point together with an inert gas in contact with a water-soluble neutral metal salt of sulfuric acid, which at temperatures up to 220° C. retains 1 molecule of water of crystallization.

7. The method of producing terpenes comprising passing vapors of a body of the group formed by pinene and nopinene at a temperature above its boiling point together with nitrogen gas in contact with a water-soluble neutral metal salt of sulfuric acid, which at temperatures up to 220° C. retains 1 molecule of water of crystallization.

8. The method of producing terpenes comprising reacting a body of the group formed by pinene and nopinene at boiling temperature with $MgSO_4.H_2O$.

9. The method of producing terpenes comprising reacting a body of the group formed by pinene and nopinene at 140° C. with $NiSO_4.H_2O$.

JOHANNES REBNER.